US012267328B2

(12) United States Patent
Nainar et al.

(10) Patent No.: US 12,267,328 B2
(45) Date of Patent: Apr. 1, 2025

(54) MULTITENANT NETWORK ORCHESTRATION

(71) Applicant: Cisco Technology, Inc., San Jose, CA (US)

(72) Inventors: Nagendra Kumar Nainar, Morrisville, NC (US); Carlos M. Pignataro, Cary, NC (US); John Matthew Swartz, Lithia, FL (US); Paul Brian Giralt, Cary, NC (US); David John Zacks, Vancouver (CA); Gonzalo Salgueiro, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 342 days.

(21) Appl. No.: 17/695,265

(22) Filed: Mar. 15, 2022

(65) Prior Publication Data

US 2023/0300138 A1    Sep. 21, 2023

(51) Int. Cl.
*H04L 9/40* (2022.01)

(52) U.S. Cl.
CPC .......... *H04L 63/102* (2013.01); *H04L 63/029* (2013.01); *H04L 63/0435* (2013.01); *H04L 63/105* (2013.01); *H04L 63/20* (2013.01)

(58) Field of Classification Search
CPC . H04L 63/102; H04L 63/029; H04L 63/0435; H04L 63/105; H04L 63/20
USPC ............................................................ 726/4
See application file for complete search history.

(56) References Cited

U.S. PATENT DOCUMENTS

| 6,587,469 | B1* | 7/2003 | Bragg ..................... H04L 45/60 370/399 |
| 6,674,756 | B1* | 1/2004 | Rao ......................... H04L 47/32 709/229 |
| 10,313,346 | B1 | 6/2019 | O'Neill et al. |
| 10,826,775 | B1 | 11/2020 | Moreno et al. |
| 11,082,259 | B1 | 8/2021 | Devaraj et al. |

(Continued)

OTHER PUBLICATIONS

"Cisco Wireless Controller Configuration Guide, Release 8.5," Cisco, https://www.cisco.com/c/en/us/td/docs/wireless/controller/8-5/config-guide/b_cg85/configuring_officeextend_access_points.html#ID2064, updated: Jun. 3, 2021, 18 pages.

(Continued)

*Primary Examiner* — Michael S McNally
(74) *Attorney, Agent, or Firm* — Edell, Shapiro & Finnan, LLC (57) ABSTRACT

Methods are provided in which a network device hosts distinct network access resources that are managed by different entities. The method includes obtaining a request for partitioning one or more network resources of an on-premise network device for connecting one or more endpoints to a first network managed by a first entity. The on-premise network device connects one or more endpoints to a second network managed by a different entity. The method further involves partitioning, based on the request, the one or more network resources and connecting the one or more endpoints to the first network using the one or more network resources. The one or more network resources are managed by the first entity while at least one other network resource of the on-premise network device is managed by the different entity and is associated with connecting the one or more endpoints to the second network.

20 Claims, 7 Drawing Sheets

(56) References Cited

U.S. PATENT DOCUMENTS

| | | | |
|---|---|---|---|
| 2011/0318011 A1* | 12/2011 | Brassil | H04L 5/0042 398/82 |
| 2013/0067540 A1* | 3/2013 | Mukkara | H04L 69/326 709/227 |
| 2015/0139238 A1* | 5/2015 | Pourzandi | H04L 41/40 370/392 |
| 2015/0324215 A1 | 11/2015 | Borthakur | |
| 2018/0007031 A1* | 1/2018 | Jain | G06F 21/53 |
| 2018/0083923 A1 | 3/2018 | Bian et al. | |
| 2019/0289374 A1* | 9/2019 | Vilella | H04L 63/0414 |
| 2021/0120077 A1* | 4/2021 | Guim Bernat | H04L 63/0435 |
| 2022/0239627 A1* | 7/2022 | Devireddy | H04L 61/2532 |

OTHER PUBLICATIONS

"Managed Service Providers (MSPs)," Cisco Meraki, https://documentation.meraki.com/General_Administration/Managed_Service_Providers_(MSPs), updated: Oct. 9, 2020, 6 pages.

\* cited by examiner

MULTITENANT NETWORK ORCHESTRATION

TECHNICAL FIELD

The present disclosure generally relates to data and communication networks.

BACKGROUND

Enterprises are reimagining the workforce by providing flexibility for their employees (as referred to as teleworkers) to work full-time or part-time in a remote environment (the latter being a so-called "hybrid work" model). The distributed and mobile nature of the workforce involves heightened security and an ability to apply different security and administrative policies as close to the teleworkers as possible. Additionally, an enterprise's Information Technology (IT) team needs visibility into network connectivity of its employees regardless of where they are to facilitate diagnostics and troubleshooting. As such, different access and security policies may be bundled into a virtual home office solution. A virtual home office solution may involve an enterprise-managed router that is installed at the teleworker's home and provisioned and operated by the enterprise's IT team. To improve productivity, other enterprise tools, such as collaboration endpoints, smart cameras, digital whiteboards, etc. may also installed in the teleworker's home. These enterprise tools leverage the home office router to connect to the enterprise network over an encrypted connection.

DESCRIPTION OF EXAMPLE EMBODIMENTS

Overview

Techniques are presented herein in which a network device has a multi-tenant virtual office component executing thereon that enables the network device to host distinct network access resources that are managed by different entities.

In one form, a resource manager obtains a request for partitioning one or more network resources of an on-premise network device for connecting one or more endpoints to a first network managed by a first entity. The on-premise network device connects the one or more endpoints to a second network managed by a second entity different from the first entity. The resource manager partitions, based on the request, the one or more network resources of the on-premise network device and connects the one or more endpoints to the first network using the one or more network resources of the on-premise network device. The one or more network resources are managed by the first entity while at least one other network resource of the on-premise network device is managed by the second entity and is associated with connecting the one or more endpoints to the second network.

In another form, a multi-tenant network device hosts first network access resources for connecting to a first enterprise network and second network access resources for connecting to a second enterprise network. The first network access resources and the second network access resources include one or more of network traffic resources, routing policies, and network service policies. A first enterprise entity controls the first network access resources to connect an endpoint, via the multi-tenant network device, to the first enterprise network. The first network access resources are partitioned for connecting to the first enterprise network and are controlled by the first enterprise entity. A second enterprise entity, different from the first enterprise entity, controls the second network access resources to connect the endpoint, via the multi-tenant network device, to the second enterprise network. The second network access resources are partitioned for connecting to the second enterprise network and are controlled by the second enterprise entity.

EXAMPLE EMBODIMENTS

As enterprises are permitting teleworking, it is becoming a new normal to see a plethora of network devices installed in a teleworker's home with minimal or no cross-domain communication involved. For example, it is not uncommon for multiple people living in one home to be teleworking for different companies at the same time. The two enterprise networks involved may be kept separate by having independent internet connections via separate Internet Service Provider (ISP) routers, one router for advertising one or more personal Service Set Identifiers (SSIDs) for basic connectivity, entertainment, appliances, guest services, etc. and two additional enterprise-provided routers advertising respective corporate SSID for each member working for different enterprises. Such an evolution not only increases the carbon footprint but also makes it difficult to manage the network, provides limited visibility to an IT team on the underlying connection, and leads to increased wireless network interference due to multiple radios attempting to share the same airspace.

Techniques presented herein provide a cloud-managed, on-premise, multi-tenant device where multi-entity agreed security and other partition policies are applied from a cloud to improve the overall efficiency of the teleworker environment. In the techniques presented herein, a multi-tenant network device hosts different network access resources and is managed from the cloud by different tenants/entities that apply their own traffic, resources, device segmentation, and security policies to a partitioned set of resources of the multi-tenant network device. The techniques presented herein, provide partition management and security segmentation such that each enterprise has a secure access to the partitioned resources.

For example, an enterprise's Software Defined Network (SDN) controller uses an identifier (ID) along with other credentials to connect and host various network services of an enterprise such as a virtual access point (AP), monitoring, etc. In the techniques presented herein, a policy and resource manager (PRM) running on the multi-tenant virtual office (MTVO) device handles resource allocation and partitioning for each different entity. Further, in the techniques presented herein, a mechanism is provided in which the MTVO device hosts distinct networks that are each managed by different entities. For example, a user manages a personal SSID for the home network and control policies such as content filtering on this personal SSID (virtual local access network (VLAN)) while another entity, such as an enterprise, manages and controls a secure, enterprise-authenticated SSID and allows traffic to traverse an encrypted tunnel to the enterprise network and/or resources. That is, partition management and security segmentation are provided.

While some techniques may allow an enterprise to delegate some limited set of capabilities to a user, the techniques presented herein provide the opposite. That is, the user allows one or more enterprises to add additional policies and/or configurations to his/her home network device that coexist with their own settings, policies, and configurations. In one or more example embodiments, the user may decide to provide visibility into end-user defined portions of the network, for example, if these network portions are relevant to troubleshooting issues related to the enterprise. Further, the user may delegate control of the on-premise network device to multiple enterprises. For example, if two users telework for different enterprises in their home, each enterprise may be granted permissions to enable an encrypted virtual private network (VPN) tunnel from the MTVO device (on-premise network device) and generate a wireless SSID tied to the virtual routing and forwarding (VRF) associated with a respective enterprise. For security, an enterprise can elect to ensure that their traffic does not go outside of clearly defined boundaries. Traffic from the VPN tunnel may only be reached through a secure wireless SSID that leverages IEEE 802.1x authentication provided by the respective enterprise.

To ensure security, the configuration and secrets (e.g. encryption keys, passwords, etc.) for each tenant are stored in independent configuration/data stores on the MTVO device so that each enterprise delegated to provide a service on an on-premise network device (e.g., a home router) has no access to data pushed by another enterprise. Additionally, enterprise secrets are kept encrypted and hidden from even the home user, thereby protecting encryption keys from being leaked from the MTVO device. That is, partition management and security segmentation are provided.

Figure 1:
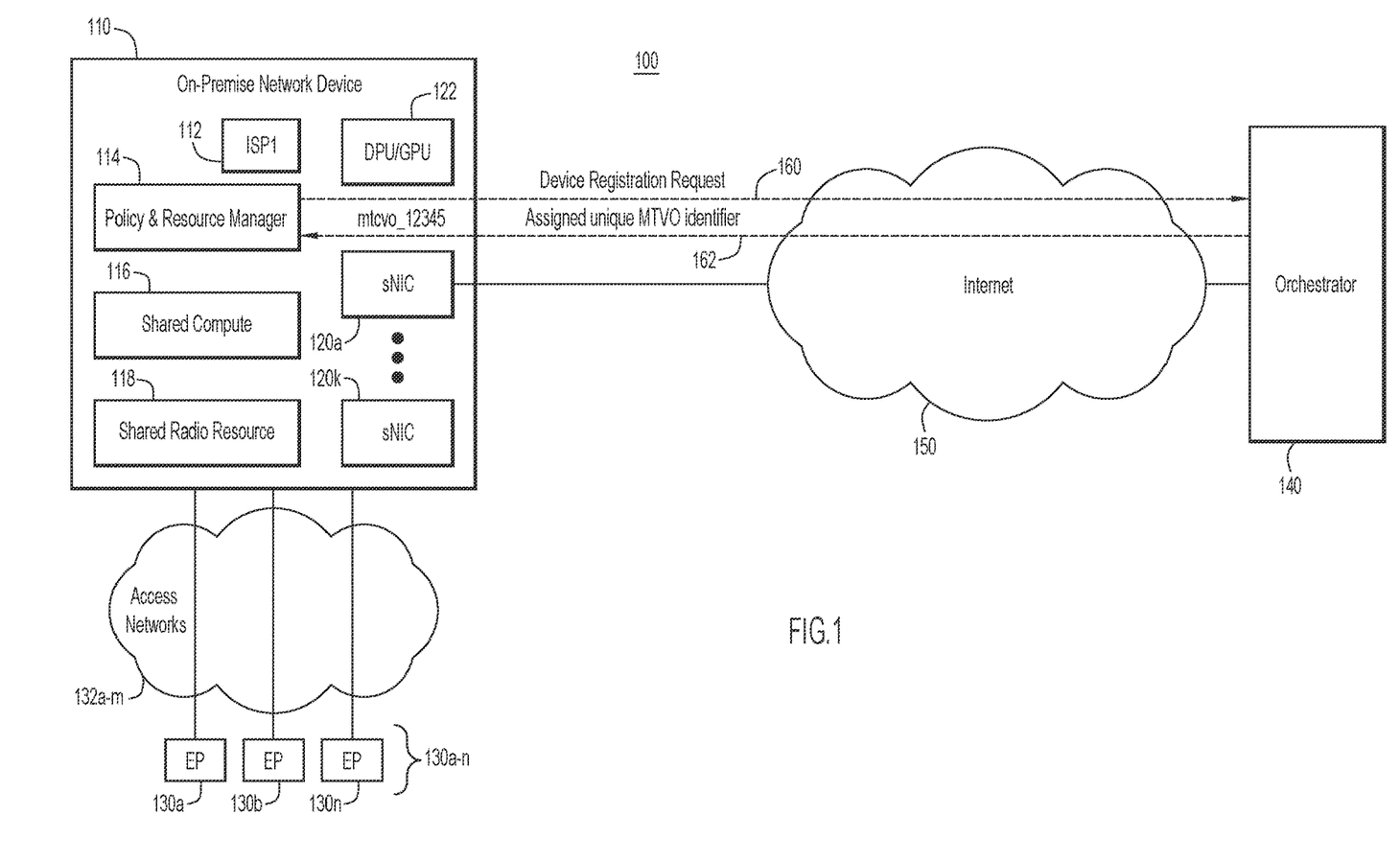
FIG. 1 is a diagram illustrating a system in which an on-premise network device is initially provisioned to serve as a multi-tenant virtual office device, according to an example embodiment.

FIG. 1 is a diagram illustrating a system 100 in which an on-premise network device is initially provisioned to serve as a MTVO device, according to an example embodiment. The system 100 includes the on-premise network device 110 connected to various endpoints (EPs) 130a-n via various access networks 132a-m, and an orchestrator 140 connected to the on-premise network device 110 via a network, such as a local area network (LAN) or a wide area network (WAN), referred to as Internet 150.

The notations "a-n", "a-m", "a-k", and the like denote that a number is not limited, can vary widely, and depends on a particular use case scenario, and need not be the same, in number. Moreover, this is only an example of the system 100, and the number and types of entities may vary based on a particular deployment and use case scenario, such as the type of service being provided and network structures.

In various example embodiments, the entities of the system 100 (on-premise network device 110, endpoints 130a-n, and orchestrator 140) may each include a network interface, at least one processor, and a memory. Each entity may be an apparatus or any programmable electronic device capable of executing computer readable program instructions. The network interface may include one or more network interface cards (having one or more ports) that enable components of the entity to send and receive packets or data over the network(s), such as internet 150, and/or wireless access networks. Each entity may include internal and external hardware components such as those depicted and described in further detail in FIG. 6 or 7. In one example, at least some of these entities (such as the orchestrator 140 or one or more endpoints 130a-n) may be embodied as virtual devices with functionality distributed over a number of hardware devices.

The on-premise network device 110 is configured to provide external network connectivity (e.g., to the internet 150) for the endpoints 130a-n. The endpoints 130a-n may include any suitable device configured to initiate a traffic flow in the system 100, such as data source device and/or data sink device. For example, the endpoints 130a-n may include a computer, an enterprise device, an appliance, an Internet of Things (IoT) device, a Personal Digital Assistant (PDA), a laptop or electronic notebook, a smartphone, a tablet, a smart camera, a digital whiteboard, and/or any other device and/or combination of devices, components, elements, and/or objects capable of initiating voice, audio, video, media, or data exchanges within the system 100. The endpoints 130a-m may also include any suitable interface to a human user such as a microphone, a display, a keyboard, or other terminal equipment. The endpoints 130a-n may be configured with appropriate hardware (e.g., processor(s), memory element(s), antennas and/or antenna arrays, baseband processors (modems), and/or the like such as those depicted and described in further detail in FIG. 7), software, logic, and/or the like to facilitate respective Over-the-Air (OTA) interfaces for accessing/connecting to on-premise network device 110 via one or more access networks 132a-m and sending or receiving packets.

The one or more access networks 132a-m have respective service set identifiers (SSIDs). For example, a first access network may be associated with a personal SSID for basic connectivity to entertainment, appliances, guests, etc. while other access networks may be associated with various enterprise SSIDs for dedicated VPN connections allocated to respective enterprises.

In the system 100, the on-premise network device 110 is further configured to connect to an orchestrator 140 via an external network such as the internet 150. The orchestrator 140 may be a cloud service that registers the on-premise network device 110 to serve as an MTVO device that hosts various network access technologies and/or network access resources for connecting to various networks such as enterprise networks under exclusive control of a respective enterprise network controller, as further detailed below with reference to FIGS. 2 and 3.

The orchestrator 140 registers the on-premise network device 110 and obtains its resource capabilities. Additionally, the orchestrator 140 authenticates one or more enterprise entities and provide security information needed to partition network access resources of the on-premise network device 110 for the enterprise network. The respective enterprise entity then controls and manages the network access resources that are segmented specifically for access to the enterprise network. In other words, by registering with the orchestrator 140, the on-premise network device 110 is configured or partitioned into separate compartments, each with respective network access resources. Each compartment is operated and managed separately by a respective associated entity. The on-premise network device 110 is thus virtualized from the perspective of control plane, data plane, and management plane. For example, the on-premise network device 110 may be a home device, a router plugged into a home environment, a home router, and/or an internet service provider (ISP) router (access point). The on-premise network device 110 is configured to advertise one or more SSIDs (one or more for each network) for a home Wi-Fi® wireless network and/or one or more enterprise Wi-Fi wireless networks.

The on-premise network device 110 includes an ISP access point (ISP1 AP) 112 component, policy and resource manager (PRM) 114, shared compute resource 116, shared radio resource 118, smart network interface cards (NICs) 120*a*-*k* (first sNIC 120*a* and second sNIC 120*k*), and a processor such as data processing unit (DPU)/graphical processing unit (GPU) 122.

The ISP1 AP 112 connects the on-premise network device 110 to an external network such as the Internet 150. The PRM 114 processes requests from various enterprise entities and determines how to satisfy these requests for various network access resources. The PRM 114 partitions the on-premise network device 110 into various components, each component being dedicated and under control of a respective associated entity. The PRM 114 partitions a portion of the shared compute resource 116 and/or shared radio resource 118 to handle virtual access point functionality, routing policy, setup configurations, encryption secrets, access controls, and so on for a respective network. The shared compute resource 116 and shared radio resource 118 may include one or more of network traffic resources, routing policies, and network service policies.

The PRM 114 may allocate a first sNIC 120*a* to a first network and a second sNIC 120*k* to a second network. Ports of the first sNIC 120*a* are mapped to the first network and serve as a virtual router controlled by a controller of the first network and ports of the second sNIC 120*k* are mapped to the second network and serve as another virtual router controlled by another controller of the second network. As such, the on-premise network device 110 is configured to be a MTVO device where network policy, network access resources, and segmentation are managed by multiple tenants/entities such as an enterprise software define network (SDN) controllers. Each tenant configures and reconfigures its respective portion of the network access resources of the on-premise network device 110.

The DPU/GPU 122 is configured to process various network packets (data traffic) to and from one or more of the endpoints 130*a*-130*n* such as a first EP 130*a*, a second EP 130*b*, and a third EP 130*n*.

A high-level description of the operation of the system 100 is now provided. At 160, the PRM 114 transmits a device registration request to the orchestrator 140. The device registration request includes network resource capabilities, such as attributes of the shared compute resource 116, the shared radio resource 118, and/or the first sNIC 120*a* and the second sNIC 120*k*. For example, the device registration request may indicate a number of ports in the sNICs 120*a*-*k*, encryption(s) supported by the on-premise network device 110, available memory, throughput, range, band, quality of service (QoS), Internet protocol (IP) version standard(s) supported, type of the on-premise network device 110, and so on. The orchestrator 140 assigns a unique MTVO device identifier (ID) and stores the unique MTVO device identifier along with the network resource capabilities of the on-premise network device 110.

At 162, the orchestrator 140 provides the unique MTVO ID to the PRM 114 such as "mtcvo_12345". The PRM 114 stores its unique MTVO identifier ("mtcvo_12345"). While in FIG. 1, the PRM 114 is an internal component executing on the on-premise network device 110, this is just an example. The PRM 114 is an agent for the on-premise network device 110 and may be a separate entity, a part of another entity such as a network device, in a cloud, and/or in a home network environment.

Figure 2:
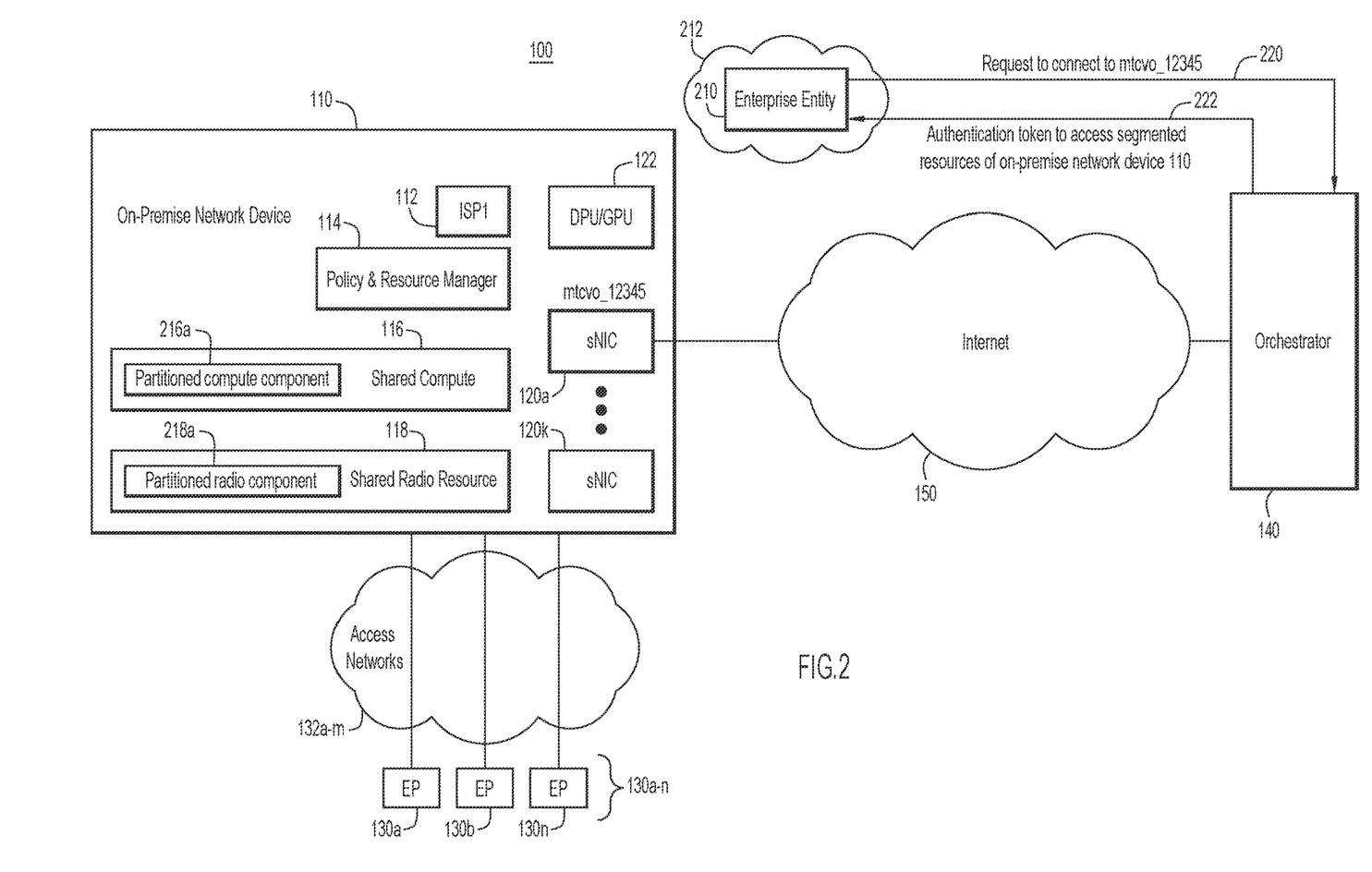
FIG. 2 is a diagram illustrating a system configured to perform a multi-tenant service orchestration for an enterprise entity, according to an example embodiment.

With continued reference to FIG. 1, FIG. 2 is a diagram illustrating the system 100 configured to perform a multitenant service orchestration for an enterprise entity, according to an example embodiment. The system 100 further includes an enterprise entity 210 of an enterprise network 212.

The enterprise entity 210 may be a management device(s) or software process associated with network infrastructure. The enterprise entity 210 may provide or be responsible for WLAN functions, such as WLAN-based access authentication services, authorization services, intrusion prevention, and/or the like to facilitate connectivity of endpoints 130*a*-*n* via the on-premise network device 110 to the enterprise network 212. The enterprise entity 210 manages remote access to the enterprise network 212. For example, the enterprise entity 210 may be a corporate SDN controller that provides remote access to the enterprise network 212 for its teleworkers. In one form, the enterprise entity 210 may be a software process running on one or more servers in a cloud (on any server in a datacenter or at any location with Internet connectivity). The enterprise entity 210 is configured with appropriate hardware (e.g., processor(s), memory element(s), and/or the like such as those depicted and described in further detail in FIG. 7), software, logic, and/or the like.

The enterprise entity 210 obtains a unique MTVO ID of the on-premise network device 110 from a respective teleworker or by querying (directly or indirectly) the on-premise network device 110 and at 220, the enterprise entity 210 transmits a request to connect to the on-premise network device 110 using the unique MTVO ID "mtcvo_12345". The orchestrator 140 authenticates the enterprise entity 210 via one or more authentication protocols, such as an authentication challenge, password based authentication, security key authentication, third-party authentication using the on-premise network device 110, etc. If the enterprise entity 210 is authenticated, at 222, the orchestrator 140 transmits an authentication token or other security information that allows the enterprise entity 210 to access and control segmented resources of the on-premise network device 110. The segmented resources may include partitioned compute component 216*a* of the shared compute resource 116, partitioned radio component 218*a* of the shared radio resource 118, and/or the first sNIC 120*a* segmented for tunneling network traffic to and from the enterprise network 212. That is, the on-premise network device 110 is configured to include an enterprise configurable portion in addition to having a user/service provider configurable portion.

Based on authenticating an enterprise entity 210 using the unique MTVO ID of the on-premise network device 110, the enterprise entity 210 (enterprise IT team and/or SDN controller) dynamically hosts, orchestrates, and manages various enterprise-specific functionalities on the on-premise network device 110. For example, the enterprise SDN controller uses the MTVO ID along with other credentials (e.g., a security token) to connect via a cloud to host various functionalities such as virtual AP, monitoring agents, security agents, etc., on the on-premise network device 110.

Figure 3:
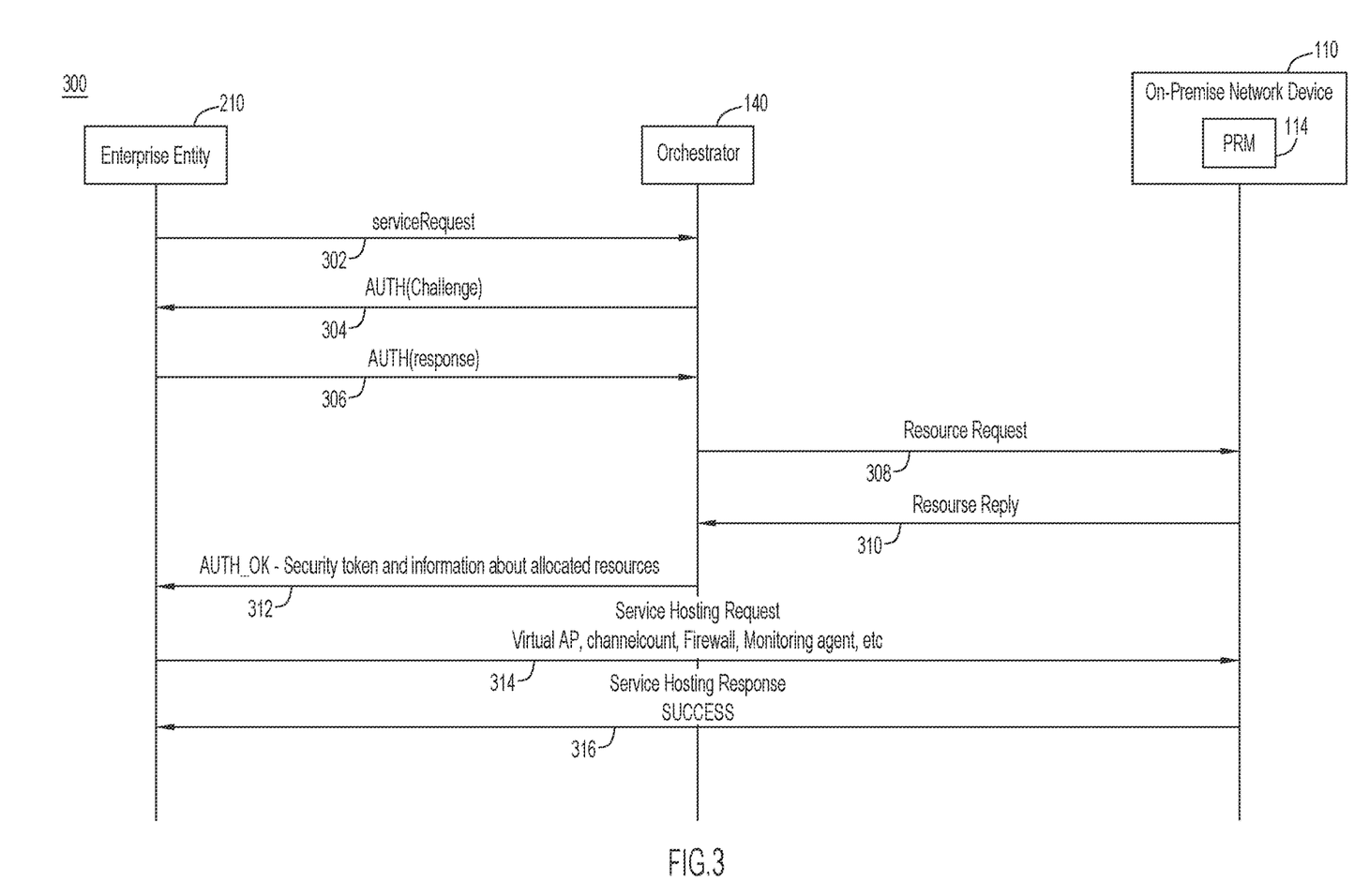
FIG. 3 is a flow diagram illustrating a method of partitioning an on-premise network device to host various network access resources under the control of different entities, according to an example embodiment.

With continued reference to FIGS. 1 and 2, FIG. 3 is a flow diagram illustrating a method 300 of partitioning an on-premise network device to host various network access resources under the control of different entities, according to an example embodiment. The method 300 involves the PRM 114 of the on-premise network device 110. The PRM 114 is an agent of the on-premise network device 110 and may be external to the on-premise network device 110. The PRM 114 handles resource allocation and may, optionally, post infrastructure logs to a cloud (e.g., the orchestrator 140). The method 300 further involves the enterprise entity 210.

In the method 300, at 302, the enterprise entity 210 transmits a service request to the orchestrator 140. The service request includes a unique MTVO ID of the on-premise network device 110 and required or desired network access resources (network traffic resources, routing policies, and/or network service policies) for connecting to the enterprise network 212.

For example, the enterprise entity 210 may request a secure key store on the on-premise network device 110 whereby only the enterprise entity 210 has the credentials to modify this configuration. For recovery purposes, a user of the endpoints 130a-n may be presented with an option to clear out the enterprise configuration stored in this secure key store but the user is not able to access and/or modify information in the secure key store because the user does not have the encryption key to modify the configuration stored therein.

Further, the enterprise entity 210 may request one or more of the following resources.

First, a Virtual Network Segment (VRF) may be requested, which partitions certain network constructs from the rest of the network. However, to reach the external network (outside world), the on-premise network device 110 is provisioned for routing from this VRF to the internet 150 and/or performs a network address translation to a public IP address.

Second, a physical port mapping may be requested, which maps one or more physical Ethernet ports of the sNICs 120a-k to the VRF assigned to the enterprise entity 210 (policy may dictate authentication such as 802.1x applied to the ports).

Third, a wireless SSID assignment may be requested. The enterprise entity 210 requests that a wireless network is mapped to the requested VRF and provides the required security settings (passwords, secrets, certificates, etc.). These secrets are stored in the per-enterprise security store (partitioned compute component 216a).

Fourth, an encrypted tunnel connection may be requested. That is, the enterprise entity 210 may request establishing an IP security (IPSec) or other encrypted connection that ties the enterprise-defined VRF to a tunnel reaching back to an enterprise network 212.

Fifth, setting of various routing policies may be requested. A routing policy permits certain traffic to egress to the Internet 150 directly while forcing other traffic over the encrypted tunnel when it originates from the enterprise VRF.

Sixth, setting of various service policies may be requested. The service policies may include other services pushed to the on-premise network device 110 such as a firewall, an intrusion detection system (IDS), and/or other network services.

These six resources are provided by way of an example and not by way of a limitation.

At 304, the orchestrator 140 transmits an authentication challenge to the enterprise entity 210. At 306, the enterprise entity 210 transmits a response to the authentication challenge.

Based on the response, the orchestrator 140 proceeds to authenticate the enterprise entity 210. If the enterprise entity 210 is not authenticated, no further actions may be taken or the orchestrator 140 may transmit a decline of service response to the enterprise entity 210 (not shown). On the other hand, if the enterprise entity 210 is authenticated, the orchestrator 140 generates a security token or other security information that allows the enterprise entity 210 to access partitioned resources of the on-premise network device 110.

At 308, based on the requested resources in the service request of 302, the orchestrator 140 communicates with the PRM 114 to request allocation of resources specified in the service request of 302.

The PRM 114 checks available resources of the on-premise network device 110 and allocates a portion of the network access resources for the enterprise entity 210, such as the partitioned compute component 216a that may include secure key store, the partitioned radio component 218a that may include VRF, and/or the first sNIC 120a that may include physical port mapping and a routing policy. At 310, the PRM 114 sends a resource reply to the orchestrator 140 indicating allocated resources for the enterprise entity 210. At 312, the orchestrator 140 transmits an authentication success message (AUTH_OK) to the enterprise entity 210. The authentication success message includes the security token and information about one or more of the allocated resources of the on-premise network device 110. For example, the information may include identification, location, and other information regarding a virtual access point, allocated physical port(s), virtual firewall, intrusion detection system (IDS), and/or virtual routing and forwarding (VRF) data, thus providing partition management and security segmentation.

The enterprise entity 210 is then provisioned to communicate with the on-premise network device 110 and exclusively controls the allocated resources of the on-premise network device 110 based on the security token. That is, the enterprise entity 210 hosts one or more enterprise services, such as a virtual AP, network monitoring, etc., using the allocated resources of the on-premise network device 110. The enterprise entity 210 is one of the tenants of the on-premise network device 110.

The method 300 involves, at 314, the enterprise entity 210 transmitting a service hosting request to the PRM 114. The service hosting request includes one or more of the virtual AP, channel count, firewall, monitoring agent, etc., that are to be provided by the on-premise network device 110 using the allocated resources for the enterprise entity 210.

In one example embodiment, the PRM 114 may cause a home user, via one of the endpoints 130a-n, to accept the requested configuration changes of the on-premise network device 110 before these configuration changes are applied to the on-premise network device 110, similar to how a SmartPhone user accepts a management profile pushed down by an enterprise mobility management solution. If the user accepts the requested configuration changes, at 316, the PRM 114 transmits a service hosting response or reply that indicates that the allocated resources have been provisioned for services requested by the enterprise entity 210. The enterprise entity 210 may reconfigure the allocated resources of the on-premise network device 110 as needed. The allocated resources provide access to the enterprise network 212 under exclusive control of the enterprise entity 210.

In one example embodiment, an overall configuration of the on-premise network device 110 is performed from the cloud (the orchestrator 140). As such, a cloud management platform is another tenant on the on-premise network device 110. The cloud management platform may then be a "default" tenant managed by the user via one of the endpoints 130*a*-*n*.

The method 300 is one example of partitioning the on-premise network device 110 to host various network access resources under the control of different entities. In one or more example embodiments, each tenant (e.g., the enterprise entity 210) may send a resource allocation request directly to the on-premise network device 110 using the security token obtained from the orchestrator 140 and receive resource reply from the on-premise network device 110. Further, the enterprise entity 210 may request resource repartitioning on the on-premise network device 110 by communicating with the PRM 114.

For example, a family of four (four users) lives in a single house with a single Internet connection via ISP1 AP 112 of the on-premise network device 110. The on-premise network device 110 (e.g., a home router) then connects to the Internet 150 and registers with a cloud management service (the orchestrator 140). In the home, two users work for different enterprises (first user for a first enterprise and second user for a second enterprise). Both enterprises allow their employees (users) to access the enterprise wireless network within their home and allocate a physical port with 802.1x authentication to respective enterprise network access. The on-premise network device 110 includes 8 Ethernet ports in the sNICs 120*a*-*k*. As such, a first port is allocated to connect with the first enterprise network and a second port is allocated to connect with the second enterprise network. The remaining six ports are allocated to a default tenant (the home network).

The first user provides the unique MTVO ID to the first enterprise entity (enterprise IT team and/or SDN controller of the first enterprise network). The first enterprise entity authenticates with the cloud management service (orchestrator 140) and obtains permission or authentication to push resource requests to the on-premise network device 110. The first enterprise entity then communicates with the PRM 114 of the on-premise network device 110 to generate a first VRF, a first wireless SSID, to map a first physical port to the first VRF, and to establish an encrypted tunnel to the first enterprise network. The policy split-tunnels some traffic directly to the Internet 150 while passing through a firewall and intrusion prevention policy of the first enterprise network. The first enterprise entity is a first tenant of the on-premise network device 110.

The second user performs similar actions and the second enterprise entity pushes a different policy that adheres to the second enterprise standards. That is, the second enterprise entity authenticates with the cloud management service and obtains permission or authentication to push resource requests to the on-premise network device 110. The second enterprise entity generates a second VRF, a second wireless SSID, maps a second physical port to the second VRF, and establishes another encrypted tunnel to the second enterprise network. The policy split-tunnels some traffic directly to the Internet 150 while passing through another firewall and another intrusion prevention policy of the second enterprise network. The second enterprise entity is a second tenant of the on-premise network device 110. Each tenant has exclusive control over its portion of the network access resources and the enterprise services hosted thereon.

The home users (first user and second user) also have full control of their own SSID's, firewall rules, content filtering, etc., to provide network connectivity to the endpoints 130*a*-*n* such as home devices (televisions, gaming systems, home speakers, and Internet of Things (IoT) devices). That is, the home network controlled by the home users is a third tenant (or a default tenant) of the on-premise network device 110. The home users may allow the enterprise policy to prioritize enterprise traffic over home traffic to ensure optimum work experience. The home users cannot access or change any of the enterprise's configurations or policies. However, the home users may remove the enterprise policy from the on-premise network device 110, which would result in a complete loss of connectivity to the respective enterprise network and necessitate re-provisioning of the enterprise profile.

Techniques presented herein allow a network entity such as an enterprise SDN controller to use an ID of the MTVO device along with other credentials to connect and host enterprise network access services such as virtual AP, monitoring, etc. The PRM that may be executing on the MTVO device, handles the resource allocation/partition and applies enterprise configurations and/or policies to the partitioned resources.

In addition, techniques presented herein provide a mechanism by which a cloud-managed network device hosts distinct networks that are each managed and controlled by different network entities. For example, a home user manages a personal SSID and control policies such as content filtering on that SSID/VLAN, while an enterprise manages and controls a secure, enterprise-authenticated SSID and allows traffic to traverse an encrypted tunnel to various enterprise resources. Thus, partition management and security segmentation are provided.

Figure 4:
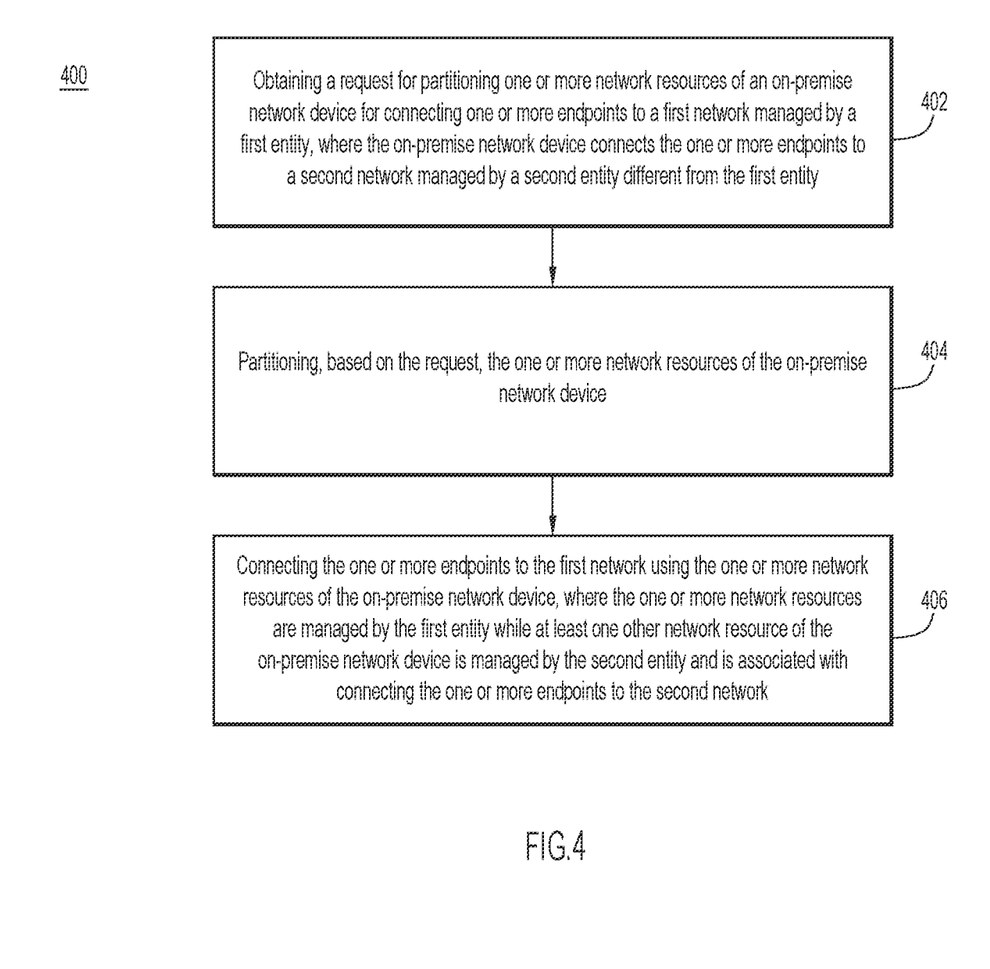
FIG. 4 is a flow diagram illustrating a method of connecting an endpoint to a first network using one or more resources of an on-premise network device that are managed by a first entity associated with the first network, according to an example embodiment.

FIG. 4 is a flowchart illustrating a method of 400 of connecting an endpoint to a first network using one or more resources of an on-premise network device that are managed by a first entity associated with the first network, according to an example embodiment. The method 400 may be performed by a resource manager, such as the PRM 114 in FIGS. 1-3.

The method 400 involves, at 402, obtaining a request for partitioning one or more network resources of an on-premise network device for connecting one or more endpoints to a first network managed by a first entity. The on-premise network device connects the one or more endpoints to a second network managed by a second entity different from the first entity.

The method 400 further involves, at 404, partitioning, based on the request, the one or more network resources of the on-premise network device and at 406, connecting the one or more endpoints to the first network using the one or more network resources of the on-premise network device. The one or more network resources are managed by the first entity while at least one other network resource of the on-premise network device is managed by the second entity and is associated with connecting the one or more endpoints to the second network.

In one or more example embodiments, the one or more network resources of the on-premise network device may include at least one of network traffic resources, routing policies, or service policies. Further, the at least one other network resource of the on-premise network device may be one or more of the network traffic resources, the routing policies, or the service policies.

In one instance, the method 400 may further involve providing, to an orchestrator, network resource capabilities of the on-premise network device and obtaining, from the orchestrator, a unique multi-tenant virtual office (MTVO) identifier assigned to the on-premise network device by the orchestrator.

In one form, the request for partitioning the one or more network resources may be based on the orchestrator obtaining, from the first entity, a service request including the unique MTVO identifier and one or more enterprise network services to be hosted by the on-premise network device. The method 400 may further involve providing a resource reply indicating that the one or more network resources of the on-premise network device are partitioned to host the one or more enterprise network services.

In one or more example embodiments, the method 400 may further involve providing, to an orchestrator, a resource reply indicating that the one or more network resources of the on-premise network device are partitioned for connecting to the first network and are under a control of the first entity.

In one instance, the method 400 may further involve obtaining, from the first entity, security information associated with configuring the one or more network resources and/or with setting one or more routing or network service policies for connecting to the first network. Additionally, the method 400 may further involve storing the security information accessible only by the first entity and reconfiguring, by the first entity, the one or more network resources of the on-premise network device when the first entity has been authenticated based on the security information.

In another instance, the method 400 may further involve the first entity configuring the one or more network resources of the on-premise network device by performing one or more of: establishing a virtual network segment (VRF) dedicated to connecting to the first network, mapping at least one port of the on-premise network device to the VRF established for connecting to the first network, assigning a service set identifier (SSID) dedicated for connecting to the first network, and establishing an encrypted tunnel for connecting the VRF to the first network.

In one or more example embodiments, the first entity may be an enterprise software define network (SDN) controller and may be authenticated, by an orchestrator, for controlling the one or more network resources of the on-premise network device. The first entity may obtain security information for controlling the one or more network resources of the on-premise network device. The at least one other network resource of the on-premise network device may be managed by the second entity and may be associated with connecting the one or more endpoints to the second network.

Figure 5:
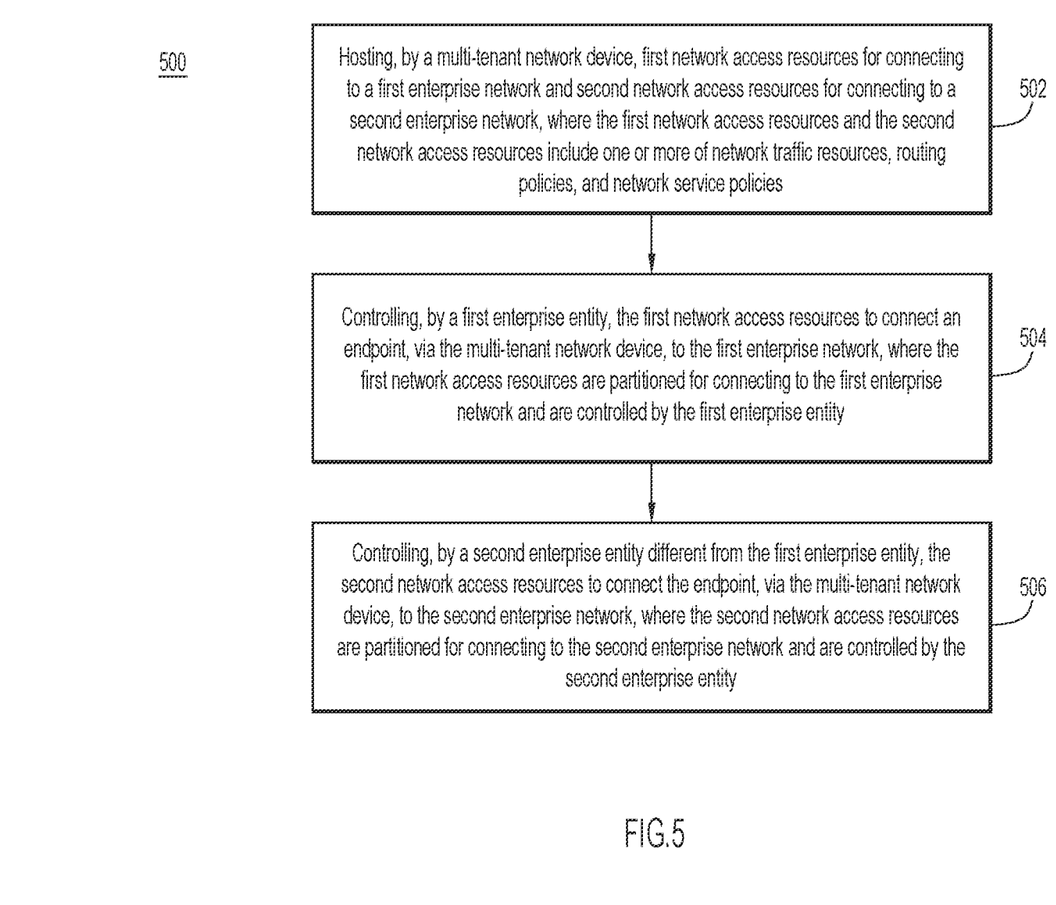
FIG. 5 is a flow diagram illustrating a method of controlling, by an entity associated with a first network, first network access resources of a multi-tenant network device and, by a different entity, second network access resources of the multi-tenant network device, according to another example embodiment.

FIG. 5 is a flowchart illustrating a method of 500 of controlling, by an entity associated with a first network, first network access resources of a multi-tenant network device and, by a different entity, second network access resources of the multi-tenant network device, according to another example embodiment. The method 500 may be performed by a multi-tenant network device, such as the on-premise network device 110 shown in FIGS. 1-3.

The method 500 involves at 502, a multi-tenant network device hosting first network access resources for connecting to a first enterprise network and second network access resources for connecting to a second enterprise network. The first network access resources and the second network access resources include one or more of network traffic resources, routing policies, and network service policies.

The method 500 further involves at 504, a first enterprise entity controlling the first network access resources to connect an endpoint, via the multi-tenant network device, to the first enterprise network. The first network access resources are partitioned for connecting to the first enterprise network and are controlled by the first enterprise entity.

The method 500 further involves at 506, a second enterprise entity, different from the first enterprise entity, controlling the second network access resources to connect the endpoint, via the multi-tenant network device, to the second enterprise network. The second network access resources are partitioned for connecting to the second enterprise network and are controlled by the second enterprise entity.

In one or more example embodiments, the operation 504 of the first enterprise entity controlling the first network access resources may include the first enterprise entity performing one or more of: establishing a virtual network segment (VRF) dedicated to connecting to the first enterprise network, mapping at least one port of the multi-tenant network device to the VRF established for connecting to the first enterprise network, assigning a service set identifier (SSID) dedicated for connecting to the first enterprise network, and establishing an encrypted tunnel for connecting the VRF to the first enterprise network.

In one form, the VRF may be a first VRF, the at least one port may be a first port, the SSID may be a first SSID, and the encrypted tunnel may be a first encrypted tunnel. The operation 506 of the second enterprise entity controlling the second network access resources may include the second enterprise entity performing one or more of: establishing a second VRF dedicated to connecting to the second enterprise network, mapping a second port of the multi-tenant network device to the second VRF, the second port is different from the first port, assigning a second SSID dedicated for connecting to the second enterprise network, and establishing a second encrypted tunnel for connecting the second VRF to the second enterprise network.

In one instance, the first enterprise entity may be an enterprise software define network (SDN) controller and may be authenticated, by an orchestrator, for controlling the first network access resources of the multi-tenant network device. The first enterprise entity may obtain security information for controlling the first network access resources of the multi-tenant network device.

In one or more example embodiments, the second enterprise entity may be another SDN controller and may be authenticated, by the orchestrator, for controlling the second network access resources of the multi-tenant network device. The second enterprise entity may obtain different security information for controlling the second network access resources of the multi-tenant network device.

Figure 6:
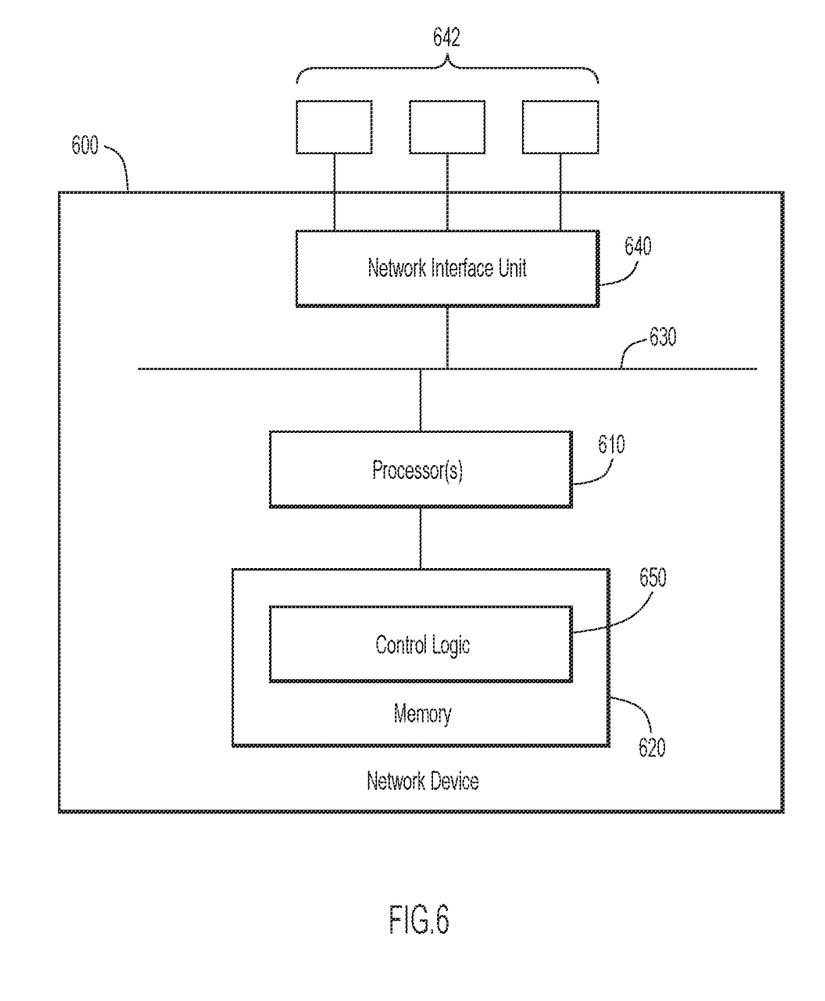
FIG. 6 is a hardware block diagram of an on-premise network device configured to perform functions associated with operations discussed herein, according to various example embodiments.

Referring to FIG. 6, FIG. 6 illustrates a hardware block diagram of a network element (node) 600 such as a home router or the on-premise network device 110. The network node 600 is configured to perform the operations described above and depicted in connection with FIGS. 1-5. The network node 600 includes one or more control processors 610, memory 620, a bus 630 and a network processor unit 640. The control processor 610 may be a microprocessor or microcontroller. The network processor unit 640 may include one or more Application Specific Integrated Circuits (ASICs), linecards, etc., and facilitates network communications between the node 600 and other network nodes.

There are a plurality of network ports 642 at which the node 600 receives packets and from which the node 600 sends packets into the network. The processor 610 executes instructions associated with software stored in memory 620. Specifically, the memory 620 stores instructions for control logic 650 that, when executed by the processor 610, causes the processor 610 to perform various operations on behalf of the network node 600 as described herein. The memory 620 also stores configuration information received from a controller to configure the network node 600 according to desired network functions. It should be noted that in some embodiments, the control logic 650 may be implemented in the form of firmware implemented by one or more ASICs as part of the network processor unit 640.

The memory 620 may include read only memory (ROM) of any type now known or hereinafter developed, random access memory (RAM) of any type now known or hereinafter developed, magnetic disk storage media devices, tamper-proof storage, optical storage media devices, flash memory devices, electrical, optical, or other physical/tangible memory storage devices. In general, the memory 620 may comprise one or more tangible (non-transitory) computer readable storage media (e.g., a memory device) encoded with software comprising computer executable instructions and when the software is executed (by the processor 610) it is operable to perform certain network node operations described herein.

Figure 7:
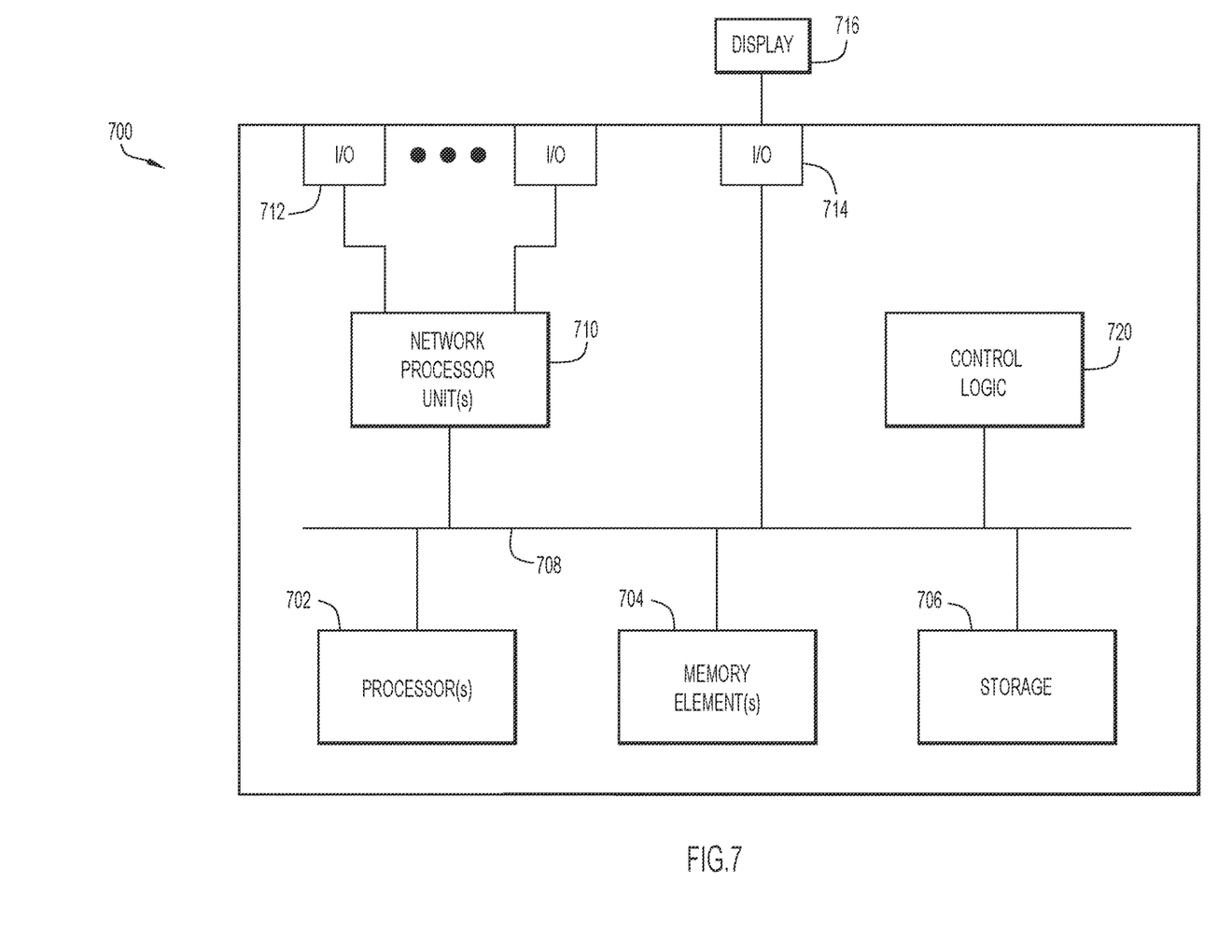
FIG. 7 is a hardware block diagram of a computing device that may perform functions associated with any combination of operations in connection with the techniques depicted and described in FIGS. 1-5, according to various example embodiments.

FIG. 7 is a hardware block diagram of a computing device 700 that may perform functions associated with any combination of operations in connection with the techniques depicted in FIGS. 1-5, according to various example embodiments, including, but not limited to, operations of the one or more endpoints 130a-n, or the orchestrator 140 that are shown in FIGS. 1-3. Further, the computing device 700 may be representative of the enterprise entity 210 shown in FIGS. 2 and 3. It should be appreciated that FIG. 7 provides only an illustration of one example embodiment and does not imply any limitations with regard to the environments in which different example embodiments may be implemented. Many modifications to the depicted environment may be made.

In at least one embodiment, computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with one or more memory elements 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, and/or any other I/O port(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor 716, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided. The apparatus includes a network interface to receive and send packets in a network and a processor. The processor is configured to perform operations including obtaining a request for partitioning one or more network resources of the apparatus for connecting one or more endpoints to a first network managed by a first entity. The apparatus connects the one or more endpoints to a second network managed by a second entity different from the first entity. The operations further involve partitioning, based on the request, the one or more network resources of the apparatus and connecting the one or more endpoints to the first network using the one or more network resources of the apparatus. The one or more network resources are managed by the first entity while at least one other network resource of the apparatus is managed by the second entity and is associated with connecting the one or more endpoints to the second network.

In yet another example embodiment, an apparatus is provided. The apparatus includes a network interface configured to receive and send packets in a network and a processor. The processor is configured to perform various operations. The operations include hosting first network access resources for connecting to a first enterprise network and second network access resources for connecting to a second enterprise network. The first network access resources and the second network access resources include one or more of network traffic resources, routing policies, and network service policies. The operations further include a first enterprise entity controlling the first network access resources to connect an endpoint, via the apparatus, to the first enterprise network. The first network access resources are partitioned for connecting to the first enterprise network and are controlled by the first enterprise entity. The operations further include a second enterprise entity, different from the first enterprise entity, controlling the second network access resources to connect the endpoint, via the apparatus, to the second enterprise network. The second network access resources are partitioned for connecting to the second enterprise network and are controlled by the second enterprise entity.

In yet another example embodiment, one or more non-transitory computer readable storage media encoded with instructions are provided. When the media is executed by a processor, the instructions cause the processor to execute a method that includes a resource manager obtaining a request for partitioning one or more network resources of an on-premise network device for connecting one or more endpoints to a first network managed by a first entity. The on-premise network device connects the one or more endpoints to a second network managed by a second entity different from the first entity. The method further involves partitioning, based on the request, the one or more network resources of the on-premise network device and connecting the one or more endpoints to the first network using the one or more network resources of the on-premise network device. The one or more network resources are managed by the first entity while at least one other network resource of the on-premise network device is managed by the second entity and is associated with connecting the one or more endpoints to the second network.

In yet another example embodiment, one or more non-transitory computer readable storage media encoded with instructions are provided. When the media is executed by a processor, the instructions cause the processor to execute another method that involves a multi-tenant network device hosting first network access resources for connecting to a first enterprise network and second network access resources for connecting to a second enterprise network. The first network access resources and the second network access resources include one or more of network traffic resources, routing policies, and network service policies. This other method further involves a first enterprise entity controlling the first network access resources to connect an endpoint, via the multi-tenant network device, to the first enterprise network. The first network access resources are partitioned for connecting to the first enterprise network and are controlled by the first enterprise entity. This other method further involves a second enterprise entity, different from the first enterprise entity, controlling the second network access resources to connect the endpoint, via the multi-tenant network device, to the second enterprise network. The second network access resources are partitioned for connecting to the second enterprise network and are controlled by the second enterprise entity.

In yet another example embodiment, a system is provided that includes the devices and operations explained above with reference to FIGS. 1-7.

The programs described herein (e.g., control logic 720) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 706 and/or memory elements(s) 704 can store data, software, code, instructions (e.g., processor instructions), logic, parameters, combinations thereof, and/or the like used for operations described herein. This includes the storage 706 and/or memory elements(s) 704 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
obtaining, by a resource manager, a request for partitioning one or more network resources of an on-premise network device for connecting one or more endpoints to a first network managed by a first entity, wherein the on-premise network device connects the one or more endpoints to a second network managed by a second entity different from the first entity;
partitioning, based on the request, the one or more network resources of the on-premise network device; and
connecting the one or more endpoints to the first network using the one or more network resources of the on-premise network device, wherein the one or more network resources are managed by the first entity while at least one other network resource of the on-premise network device is managed by the second entity and is associated with connecting the one or more endpoints to the second network.

2. The method of claim 1, wherein the one or more network resources of the on- premise network device include at least one of network traffic resources, routing policies, or service policies and wherein the at least one other network resource of the on-premise network device is one or more of the network traffic resources, the routing policies, or the service policies.

3. The method of claim 2, further comprising:
providing, by the resource manager to an orchestrator, network resource capabilities of the on-premise network device; and
obtaining, from the orchestrator, a unique multi-tenant virtual office (MTVO) identifier assigned to the on-premise network device by the orchestrator.

4. The method of claim 3, wherein the request for partitioning the one or more network resources is based on the orchestrator obtaining, from the first entity, a service request including the unique MTVO identifier and one or more enterprise network services to be hosted by the on-premise network device and further comprising:
providing, by the resource manager, a resource reply indicating that the one or more network resources of the on-premise network device are partitioned to host the one or more enterprise network services.

5. The method of claim 1, further comprising:
providing, by the resource manager to an orchestrator, a resource reply indicating that the one or more network resources of the on-premise network device are partitioned for connecting to the first network and are under a control of the first entity.

6. The method of claim 5, further comprising:
obtaining, from the first entity, security information associated with configuring the one or more network resources and/or with setting one or more routing or network service policies for connecting to the first network;
storing, by the on-premise network device, the security information accessible only by the first entity; and
reconfiguring, by the first entity, the one or more network resources of the on-premise network device when the first entity has been authenticated based on the security information.

7. The method of claim 1, further comprising:
configuring, by the first entity, the one or more network resources of the on-premise network device by performing one or more of:
establishing a virtual network segment (VRF) dedicated to connecting to the first network;
mapping at least one port of the on-premise network device to the VRF established for connecting to the first network;
assigning a service set identifier (SSID) dedicated for connecting to the first network; and
establishing an encrypted tunnel for connecting the VRF to the first network.

8. The method of claim 1, wherein the first entity is an enterprise software define network (SDN) controller and is authenticated, by an orchestrator, for controlling the one or more network resources of the on-premise network device and wherein the first entity obtains security information for controlling the one or more network resources of the on-premise network device and wherein the at least one other network resource of the on-premise network device is managed by the second entity and is associated with connecting the one or more endpoints to the second network.

9. An apparatus comprising:
a network interface to receive and send packets in a network; and
a processor, wherein the processor is configured to perform operations comprising:
obtaining a request for partitioning one or more network resources of the apparatus for connecting one or more endpoints to a first network managed by a first entity, wherein the apparatus connects the one or more endpoints to a second network managed by a second entity different from the first entity;
partitioning, based on the request, the one or more network resources of the apparatus; and
connecting the one or more endpoints to the first network using the one or more network resources of the apparatus, wherein the one or more network resources are managed by the first entity while at least one other network resource of the apparatus is managed by the second entity and is associated with connecting the one or more endpoints to the second network.

10. The apparatus of claim 9, wherein the one or more network resources of the apparatus include at least one of network traffic resources, routing policies, or service policies and wherein the at least one other network resource of the apparatus is one or more of the network traffic resources, the routing policies, or the service policies.

11. The apparatus of claim 10, wherein the processor is further configured to perform additional operations comprising:
providing, to an orchestrator, network resource capabilities of the apparatus; and
obtaining, from the orchestrator, a unique multi-tenant virtual office (MTVO) identifier assigned to the apparatus by the orchestrator.

12. The apparatus of claim 11, wherein the request for partitioning the one or more network resources is based on the orchestrator obtaining, from the first entity, a service request including the unique MTVO identifier and one or more enterprise network services to be hosted by the apparatus and wherein the processor is further configured to perform an additional operation comprising:
providing a resource reply indicating that the one or more network resources of the apparatus are partitioned to host the one or more enterprise network services.

13. The apparatus of claim 9, wherein the processor is further configured to perform an additional operation comprising:
providing, to an orchestrator, a resource reply indicating that the one or more network resources of the apparatus are partitioned for connecting to the first network and are under a control of the first entity.

14. The apparatus of claim 13, wherein the processor is further configured to perform additional operations comprising:
obtaining, from the first entity, security information associated with configuring the one or more network resources and/or with setting one or more routing or network service policies for connecting to the first network;
storing the security information accessible only by the first entity; and
reconfiguring the one or more network resources of the apparatus when the first entity has been authenticated based on the security information.

15. The apparatus of claim 9, wherein the processor is further configured to perform an additional operation of configuring, under control of the first entity, the one or more network resources of the apparatus by performing one or more of:
establishing a virtual network segment (VRF) dedicated to connecting to the first network;
mapping at least one port of the network interface to the VRF established for connecting to the first network;
assigning a service set identifier (SSID) dedicated for connecting to the first network; and
establishing an encrypted tunnel for connecting the VRF to the first network.

16. One or more non-transitory computer readable storage media encoded with software comprising computer executable instructions that, when executed by a processor, cause the processor to perform a method including:
obtaining a request for partitioning one or more network resources of an on-premise network device for connecting one or more endpoints to a first network managed by a first entity, wherein the on-premise network device connects the one or more endpoints to a second network managed by a second entity different from the first entity;
partitioning, based on the request, the one or more network resources of the on-premise network device; and
connecting the one or more endpoints to the first network using the one or more network resources of the on-premise network device, wherein the one or more network resources are managed by the first entity while at least one other network resource of the on-premise network device is managed by the second entity and is associated with connecting the one or more endpoints to the second network.

17. The one or more non-transitory computer readable storage media according to claim 16, wherein the one or more network resources of the on-premise network device include at least one of network traffic resources, routing policies, or service policies and wherein the at least one other network resource of the on-premise network device is one or more of the network traffic resources, the routing policies, or the service policies.

18. The one or more non-transitory computer readable storage media according to claim 17, wherein the computer executable instructions cause the processor to further perform:
providing, to an orchestrator, network resource capabilities of the on-premise network device; and
obtaining, from the orchestrator, a unique multi-tenant virtual office (MTVO) identifier assigned to the on-premise network device by the orchestrator.

19. The one or more non-transitory computer readable storage media according to claim 18, wherein the request for partitioning the one or more network resources is based on the orchestrator obtaining, from the first entity, a service request including the unique MTVO identifier and one or more enterprise network services to be hosted by the on-premise network device and the computer executable instructions cause the processor to further perform:
providing a resource reply indicating that the one or more network resources of the on-premise network device are partitioned to host the one or more enterprise network services.

20. The one or more non-transitory computer readable storage media according to claim 16, wherein the computer executable instructions cause the processor to further perform:
providing, to an orchestrator, a resource reply indicating that the one or more network resources of the on-premise network device are partitioned for connecting to the first network and are under a control of the first entity.

* * * * *